March 15, 1938.     O. K. KJOLSETH     2,111,428
RESTRAINT DEVICE
Filed Feb. 11, 1936
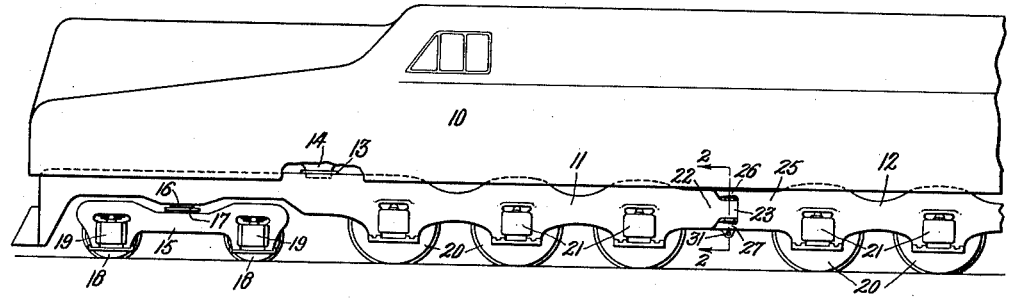
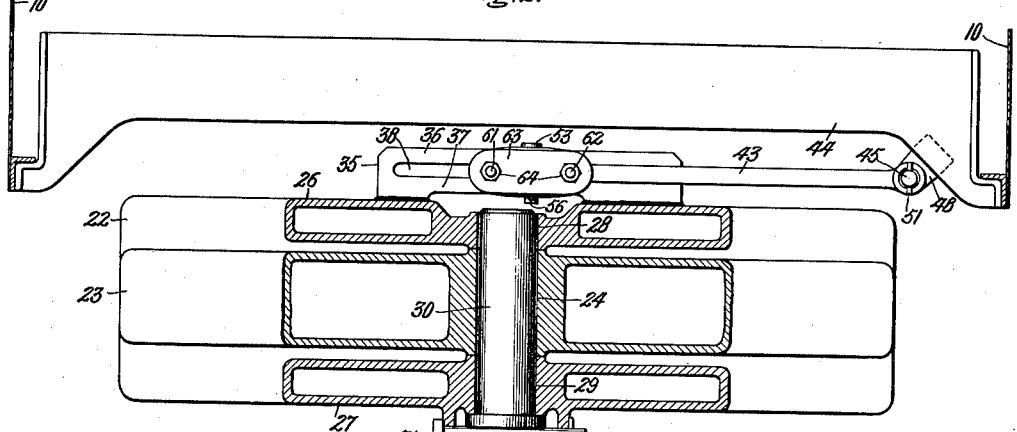
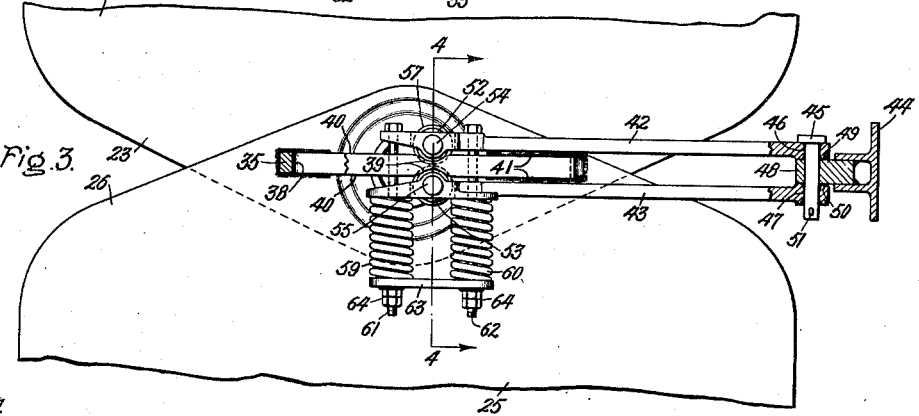
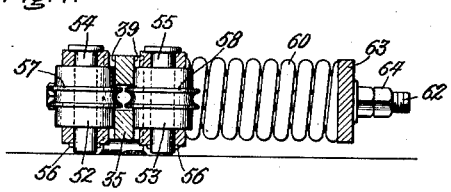
Inventor:
Ole K. Kjolseth,
by Harry E. Dunham
His Attorney.

Patented Mar. 15, 1938

2,111,428

UNITED STATES PATENT OFFICE 2,111,428

RESTRAINT DEVICE

Ole K. Kjolseth, Erie, Pa., assignor to General Electric Company, a corporation of New York Application February 11, 1936, Serial No. 63,365

5 Claims. (Cl. 105—175)

My invention relates to lateral restraint or centering devices for railway trucks for restraining small oscillatory movements of the trucks and for permitting free pivotal movement thereof when the railway vehicle enters a curve in the track.

In railway vehicles, it is usual to support the vehicle frame on a plurality of articulated trucks and, in order to lessen the pressure exerted by the flanges of the wheels against the rails when the vehicle is passing around a curve, it is necessary to provide some arrangement for permitting a limited amount of lateral pivotal movement of the truck frames relative to the vehicle frame. It is also desirable that lateral oscillations of the trucks should be restrained under normal operating conditions and that the trucks be maintained in substantial alignment, but the centering force should act only for small lateral displacements, and substantial lateral pivoting of the trucks, such as occurs when a vehicle enters a curve in the track, should not be restrained. Thus, the lateral restraint or centering device should exert a predetermined restraining force for a predetermined small range of latereal displacement from longitudinal alignment of the trucks and substantially no restraining force for any further lateral displacement within the operating range of the device.

An object of my invention is to provide an improved lateral restraint or centering device which will resiliently center laterally movable or oscillatable vehicle trucks relative to the vehicle frame and restrain small lateral oscillations of the trucks, but which will not affect larger lateral displacements, as when the vehicle enters a curve in the track.

Further objects and advantages of my invention will become apparent, and my invention will be better understood, from the following description referring to the accompanying drawing, and the features of novelty which characterize my invention will be pointed out with particularity in the claims appended to and forming a part of this specification.

In the drawing, Fig. 1 is a fragmentary side elevation of a locomotive embodying my invention; Fig. 2 is a partial sectional view of an embodiment of my improved oscillation restraint mechanism taken along line 2—2 of Fig. 1; Fig. 3 is a plan view of the embodiment of my invention illustrated in Fig. 2; Fig. 4 is a sectional view on line 4—4 of Fig. 3.

Referring to the drawing, an electric locomotive having a frame including a superstructure 10 is supported by center pins on main truck frames 11 and 12. The side frames of the main trucks 11 and 12 are rigidly connected together by cross members including a bolster 13 on which the frame of the locomotive is supported by a center pin 14. To facilitate traversing curves in the track, the outer end of the main truck frame 11 is supported upon a pivoted guiding truck 15 by a center pin 16 laterally movable with respect to the guiding truck and carried by a guiding truck center plate 17. The guiding truck is of the double axle type provided with wheels 18 mounted on axles journaled in journal boxes 19 which support the guiding truck frame 15.

The locomotive is propelled by driving wheels 20 through axles journaled in journal boxes 21 on which the frames of the main trucks are supported. The main trucks are of the articulated type. The end frame 22 of the truck 11 is provided with a tongue or sill 23 extending laterally thereof and having a vertically extending opening 24 therethrough on the longitudinal center line of the truck. The end frame of the main truck 12 is provided with yokes or sills 26 and 27 having vertically aligned openings 28 and 29. The sills 23, 26, and 27 are provided with bearing surfaces adjacent the openings 24, 28, and 29 and are pivotally secured together by an articulation pin 30 extending through the openings 28, 24, and 29. The articulation pin 30 is retained in position by a pin 31 extending through flanges 32 and 33 formed on the lower sill 27 adjacent the opening 29 and this pin 31 is secured in position by a cotter pin 34.

Irregularities in the track tend to produce oscillations of the trucks about the center pins which pivotally support the locomotive frame, and it is desirable that these oscillations should be restrained in order to provide a smooth operation of the vehicle. These oscillations of the trucks produce lateral displacements of the articulation point and the outer ends of the trucks relative to the locomotive frame and, by providing a lateral restraint or centering device which will maintain substantial alignment of the trucks and the locomotive frame, these oscillations can be greatly reduced or eliminated. It is desirable that the restraint device will not restrain the lateral displacement of the end frames of the trucks beyond a predetermined range, as it is necessary that the trucks pivot about their connections to the locomotive frame when the locomotive enters a curve in the track.

I, therefore, provide the centering device with a guide 35 welded or otherwise secured to the sill 26 of the truck end frame 25. This guide is provided with cam surfaces 36 and 37 which are spaced apart by a slot 38 formed in the guide 35. These cam surfaces are provided with grooved sections 39 and parallel straight sections 40 and 41. A set of follower arms 42 and 43 are connected to the locomotive frame and are arranged on each side of the guide 35 to cooperate with the cam surfaces of the guide for exerting the desired centering force thereon. In order to provide against the transmittal of shocks and strains to the centering device, provision is made for relative vertical movement between the connection of the follower arms to the vehicle frame and the guide 35, when the vehicle passes over irregularities in the track, by pivotally securing the follower arms 42 and 43 to a sill 44 of the locomotive frame. This connection is made by a pivot pin 45 extending through openings 46 and 47 formed in the ends of the follower arms 42 and 43, respectively, and through a flange 48 which is welded to the frame sill 44. The openings 46 and 47 are formed with convex or outwardly flared surfaces and the ends 49 and 50 of the follower arms 42 and 43, respectively, are also provided with convex or rounded surfaces so that the follower arms may pivot longitudinally with respect to the pivot pin 43 to provide for slight longitudinal displacements between the vehicle frame and the guide 35, or slight pivotal movement of the follower arms, to allow them to follow the contours of the cam surfaces of the guide 35. The pin 45 is restrained in position by a cotter pin 51, which is fitted in an opening in the pin 45 out of contact with the follower arm 43, so as not to limit the pivoting action of the arms 42 and 43. This provides a universal connection between the follower arms 42 and 43 and the locomotive frame sill 44. The follower arms 42 and 43 are provided with rollers 52 and 53, respectively, which engage the cam surfaces 36 and 37 of the guide 35. These rollers are secured in position by pins 54 and 55, which extend through openings in the follower arms 42 and 43, and are retained in position by cotter pins 56. To provide against vertical displacement of the rollers 52 and 53 and to assist in guiding them along the cam surfaces of the guide 35, they are provided with flanged portions 57 and 58 which extend into the slot 38 of the guide 35. These rollers are resiliently urged into engagement with the cam surfaces by adjustable compression springs 59 and 60, which are secured to the ends of the follower arms 42 and 43 by bolts 61 and 62 having nuts 64 thereon. The bolts extending through the follower arms, the slot 38, and a follower plate 63. The restraining or centering force exerted by the follower arms upon the guide 35 may be adjusted as desired by the nuts 64, varying the compression of springs 59 and 60.

When the locomotive passes over irregularities in the track which tend to cause the trucks to oscillate and produce lateral displacements of the trucks with respect to the locomotive frame, the rollers 52 and 53 will roll in the grooved sections 39 of the cam surface and effectively restrain oscillation of the main trucks to a small limited movement with respect to the locomotive frame, and thus maintain substantial longitudinal alignment of the trucks during normal operation along a straight track. When the locomotive enters a curve, the trucks will pivot about the center pins and produce a relatively large lateral displacement of the truck end frames 22 and 25. This causes the rollers 52 and 53 to roll out of the grooved section 39 of the cam surface of the guide 35 against an initial restraint, which is determined by the adjustment of the coil springs 59 and 60, after which the rollers are in engagement with the straight portion 40 or 41 of the cam surfaces on which they roll with substantially no restraint. In this manner, the centering device provides a predetermined initial centering force for a small range of lateral displacement of the truck frames with respect to the locomotive frame, and substantially no restraining force for any further lateral displacement therebetween within the operating range thereof.

While I have illustrated and described one embodiment of my invention, modifications thereof will occur to those skilled in the art. I desire it to be understood, therefore, that my invention is not to be limited to the particular arrangement disclosed and I intend, in the appended claims, to cover all modifications which do not depart from the spirit and scope of my invention.

What I claim as new and desire to secure by Letters Patent of the United States is:

1. In combination with a locomotive or car having a frame, a plurality of trucks, each of said trucks having a pivotal support for said frame, an articulated pivotal connection between said trucks, a guide mounted on one of said trucks and having a plurality of spaced cam surfaces, a set of follower arms arranged on each side of said guide and pivotally secured to said frame, a roller carried by each of said follower arms arranged to cooperate with said cam surfaces, and means including a set of springs urging said rollers into engagement with said cam surfaces and connecting said follower arms for providing a centering force over a small range of relative lateral movement between said trucks and said frame and for providing substantially no centering force for any further relative lateral movement between said truck and said frame within the range of movement thereof.

2. In combination with a locomotive or car having a frame, a truck having a pivotal support for said frame, a guide mounted on said truck and having a plurality of spaced cam surfaces, a set of follower arms arranged on each side of said guide and pivotally secured to said frame, a roller carried by each of said follower arms, and means including a set of springs urging said rollers into engagement with said cam surfaces and connecting said follower arms for providing a centering force over a small range of relative pivotal movement between said truck and said frame and for providing substantially no centering force over any further relative pivotal movement between said truck and said frame within the range of movement thereof.

3. In combination with a locomotive or car having a frame, a plurality of trucks having pivotal supports for said frame, an articulated pivotal connection between said trucks, a guide having a cam surface secured to one of said trucks adjacent said articulated truck connection, a follower arm having a roller arranged to cooperate with said cam surface, a pivotal connection between said follower arm and said frame, and means including a spring urging said roller into engagement with said cam surface for providing a centering force over a small range of relative lateral movement between said trucks and said frame and for providing substantially no centering force for any further relative lateral movement between said trucks and said frame within the range of movement thereof.

4. In combination with a locomotive or car having a frame, a truck having a pivotal support for said frame, a guide mounted on said truck and having a plurality of spaced cam surfaces, a set of follower arms arranged on each side of said guide and pivotally secured to said frame, a roller carried by each of said follower arms arranged to cooperate with said cam surfaces, means including a set of springs urging said rollers into engagement with said cam surfaces and resiliently connecting said follower arms for providing a centering force over a small range of relative pivotal movement between said truck and said frame and for providing substantially no centering force for any further relative pivotal movement between said truck and said frame within the range of movement thereof, and means for adjusting the action of said springs.

5. In combination with a locomotive or car having a frame, a truck having a pivotal support for said frame, a transversely extending guide mounted on said truck having parallel sections, each of said parallel sections having a groove, a follower arm pivotally connected to said frame and extending transversely thereof, a roller carried by said follower arm and engaging said grooves of said guide, and means including a spring urging said roller into engagement with said grooves for providing a centering force over a small range of relative lateral displacement between said truck and said frame and providing substantially no centering force for any further relative lateral displacement between said truck and said frame within the range of movement thereof.

OLE K. KJOLSETH.